United States Patent [19]

Ladbrooke et al.

[11] 4,200,569

[45] Apr. 29, 1980

[54] WHEAT-BASED LIPOPROTEIN COMPLEXES AND METHODS OF MAKING AND USING SAME

[75] Inventors: Brian D. Ladbrooke, Saskatoon; Gary R. Quick; Norman S. Singer, both of London, all of Canada

[73] Assignee: John Labatt Limited, London, Canada

[21] Appl. No.: 897,283

[22] Filed: Apr. 17, 1978

[51] Int. Cl.² .............................................. A23J 1/12
[52] U.S. Cl. ................................. 260/112 G; 426/549; 426/653; 426/656
[58] Field of Search ................................. 260/112 G

[56] References Cited

U.S. PATENT DOCUMENTS

| | | | |
|---|---|---|---|
| 3,351,531 | 11/1967 | Noznick et al. | 260/112 G UX |
| 3,362,829 | 1/1968 | Landfried et al. | 260/112 G |
| 3,542,754 | 11/1970 | Felleps | 260/112 G |
| 3,783,139 | 1/1974 | Moneymaker et al. | 260/112 G |
| 3,880,824 | 4/1975 | Rao et al. | 260/112 G |
| 4,035,519 | 7/1977 | Abou-Guendia | 426/456 X |

*Primary Examiner*—Howard E. Schain
*Attorney, Agent, or Firm*—Fisher, Christen & Sabol

[57] ABSTRACT

The present invention provides a novel lipoprotein complex formed by the reaction of gliadin with selected anionic lipids. In a process aspect gliadin or a gliadin-containing substrate is reacted with a selected anionic lipid at a temperature of not more than 70° C. in an aqueous medium having a pH not greater than 7. The novel substances are useful in a variety of applications such as baking.

27 Claims, 8 Drawing Figures

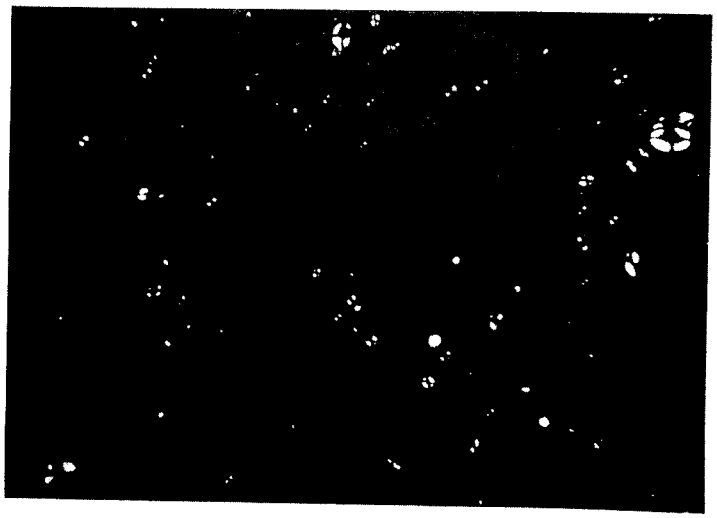
FIG. 5 (SAMPLE A)
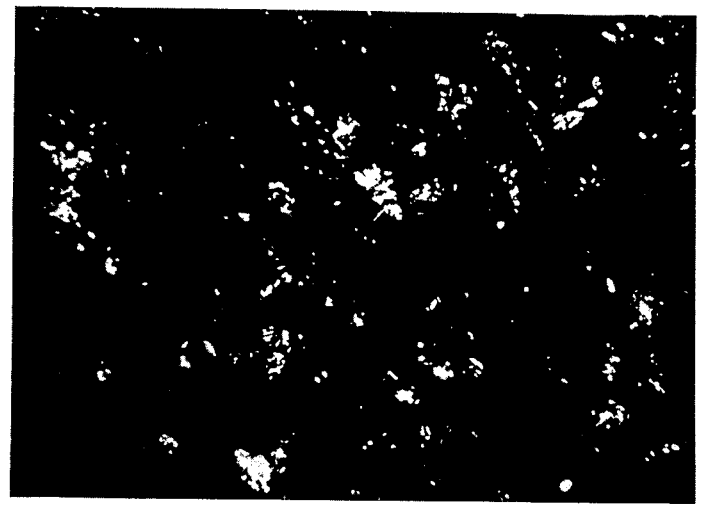
FIG. 6 (SAMPLE C₂)

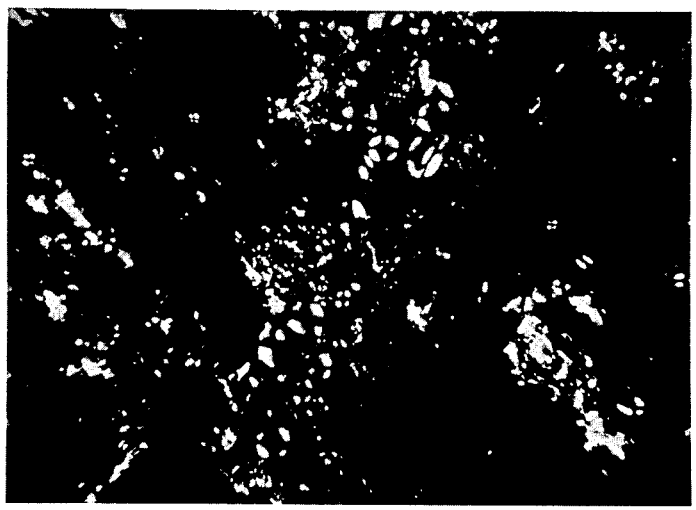
FIG. 7 (SAMPLE B₂)
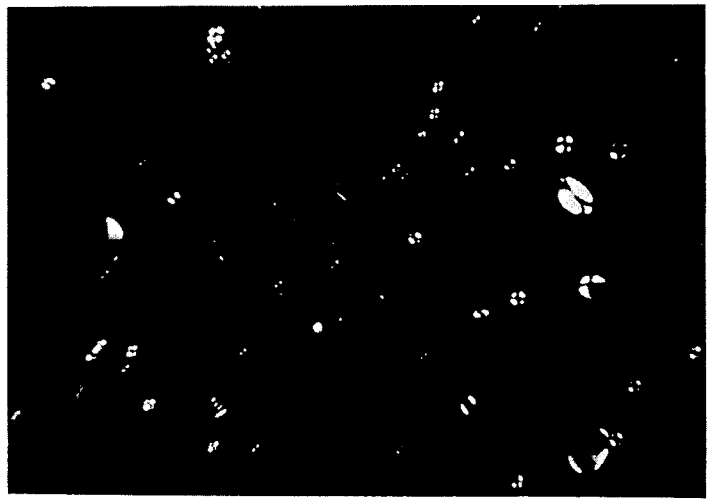
FIG. 8 (SAMPLE E₃)

WHEAT-BASED LIPOPROTEIN COMPLEXES AND METHODS OF MAKING AND USING SAME

BACKGROUND OF INVENTION

1. Field of Invention

The present invention relates to vegetable protein products and, in particular, to novel lipoprotein products derived from wheat protein, as well as processes for the production of such products, and their use.

2. Description of the Prior Art

Vegetable protein products such as soy protein in its various forms (flour, concentrate, etc.) and wheat proteins, especially vital wheat gluten, find many applications in food and other areas. Of special importance, because of the unique properties imparted by its vital or functional nature, is gluten.

Gluten is a concentrated natural protein generally taking the form of a light tan powder having a relatively bland taste and aroma. It usually contains about 75–80% protein, 6–8% native lipids, fibre, residual starch, a small amount of mineral matter and between 4 and 12% residual moisture. Gluten, per se, is generally considered to consist, in approximately equal amounts, of the proteins gliadin and glutenin. Commercially, vital wheat gluten is presently manufactured by one of several washing processes in which wheat flour is kneaded with water to remove the starch and water-soluble materials from the gluten, the latter usually being obtained as a tough, rubbery, elastic mass containing a high proportion of water (about 67% by weight). If a dry product is required, this water must be removed without exposing the gluten to excessively high temperatures (generally less than about 70° C.) since gluten can be denatured by exposure to higher temperatures, especially when in the wet state. Two drying processes in common usage are spray drying and ring drying.

Vital wheat gluten is an important item of commerce finding very many uses, especially in the manufacture of yeast-leavened bakery products such as bread, rolls and buns. In this application it supplements the natural flour protein where added strength is needed, or desired, for several reasons, say to build stronger sidewalls in expanded white bread or in the production of variety breads where the non-flour proteins dilute the flour protein to such an extent that the latter protein cannot function satisfactorily without supplementation. The utilization of conventional dry vital wheat gluten in many of these applications is hindered by some of its native characteristics. For example, in limited-moisture environments, e.g. pasta, it does not readily disperse and blend with the native wheat proteins to form the desired all encompassing matrix. On the other hand, in dilute aqueous media, e.g. batters or "brews" it rapidly coalesces producing non-uniform dispersions. Efforts have been made in the past to overcome, or to improve upon the poor dispersibility, and the tendency to coalesce when dispersed, of vital wheat gluten whilst ensuring that its vitality is not adversely affected. Some of these attempts have included treating gluten, or wheat flour containing gluten, with various lipids, for example, U.S. Pat. No. 3,362,829 to Landfried teaches coating dry, powdered gluten, via a melt process, with an amount of certain selected non-ionic hydrophilic lipids. The process is essentially a physical process, i.e. no chemical reaction or complex occurs, as is indicated, for example, by the fact that the obtainment of the desired results is dependent on the particle size (i.e. surface area) of the gluten being treated.

A later U.S. Pat. No. 3,880,824 to Rao et al acknowledges the Landfried patent and states that the coalescence problems associated with gluten may be solved by "reacting" dry, powdered gluten in an inert diluent, which may be any non-aqueous, preferably organic solvent, with an ionic or non-ionic lipid selected from the group consisting of fatty acid chlorides, fatty monoglycerides, lactylic esters of fatty acids, sorbitan fatty acid esters and phospholipids, the resulting product being claimed to be a "gluten-lipid complex". The specific examples show that, following "reaction", the solvent is evaporated and the fat content of the residue evaluated by a standard acid hydrolysis method. Since this method evaluates total fat, i.e. bound and unbound fat in the residue, this test alone cannot give any indication that the added lipid actually complexes with the gluten: as will be discussed later, separate evaluation of free and total lipid is necessary to determine if the added lipid has actually reacted (complexed) with the gluten. In fact, evaluation in this latter manner by the present applicant clearly shows that no complexing occurs between the gluten and the lipid under the given conditions.

However, as in the previous case, the presence of the dispersed lipid would give some improvement in the dispersibility of the product in aqueous media.

Yet a further attempt to provide a modified gluten having improved dispersibility characteristics is detailed in U.S. Pat. No. 4,035,519 to Maher M. Abou-Guendia. This patent refers to the above-described Landfried-type coating of the gluten with lipid and notes that using that procedure, uniform distribution of the emulsifier throughout the gluten is difficult. The disclosed process comprises mixing a melted hydrophilic and/or lipophilic emulsifier with wet gluten having a moisture content >45% at a temperature of between 40° C. and its denaturization temperature, the product optionally being dried in a known manner. Reference to the specific examples shows that mixing is effected until the emulsifier is uniformly distributed throughout the gluten and this is accomplished in a short time period of two minutes at low mixing speed. The specification refers only to an emulsified gluten which is effectively a mixture of the lipid and gluten involving, as present applicant's work shows, no significant lipid gluten reaction. As in the earlier-discussed patent specifications, acceptable utility in baking is claimed.

In other instances, attempts have been made to proceed directly from the wheat flour to a gluten product which is modified during the extraction process, the product claimed to have advantageous properties compared with gluten obtained by traditional methods. U.S. Pat. No. 3,783,139 discloses such an attempt, and in particular, a process for separating wheat flour into its starch and gluten components by forming the normal wheat dough in the presence of selected non-ionic surfactants. The process is claimed to use much less wash water than the known methods, and provide increased protein yields in the form of a modified gluten product. The text emphasizes the critical nature of the non-ionic emulsifier providing data detailing the failure of other emulsifiers to be effective.

While gluten's resilient, chewy, irreversibly gelled texture when cooked would be desirable in several significant non-bakery applications, e.g. meat and cheese analogues and extenders, confectionery gels and sausage casings, its use in such applications has been hindered by, when such applications are considered, undesirable characteristics, for example:

(a) A group of characteristics which dictate the conditions required to develop the structure/texture of conventional gluten, these conditions including, available moisture; work input (taking into account the extent, and type of, mixing); fat content and the presence of significant amounts of apparently incompatable substances such as soy protein.

(b) A group of characteristics which relate to the handling properties of the resilient gluten once formed. These characteristics include:

(i) work hardening-gluten as it is mechanically worked becomes firmer until a maximum is reached, continued working resulting in a breakdown of the gluten structure;

(ii) thermosetting-gluten coagulates when heated at temperatures above 60° C. for a period of time; and (iii) a high viscosity/rubbery nature.

Notwithstanding the difficulties, many attempts have been made to use gluten in such non-baking applications. Refer for example to U.S. Pat. No. 3,682,661 to Albin F. Turbak which discloses the use of edible gluten films to be used as coverings, such as sausage skins for emulsion meat products. However, attempts such as this have not been successful primarily because the resulting gluten films are found to be lacking in the strength and maleability required, especially as regards their ability to be self-supporting and, consequently, supplementation with other film-forming materials such as collagen has been necessary and/or processing conditions must be very severe.

SUMMARY OF THE INVENTION

An object of this invention is to produce a gluten-based product which is non-coalescing in dilute dispersion but which, in environments more limiting in moisture, disperses uniformly, blending with the native wheat proteins to form the desired, all-encompassing matrix.

A further object of the present invention is to provide a novel gluten-based lipoprotein which has enhanced absorption, film-formation and loaf volume characteristics compared with the prior art products.

It is a further object of the present invention to provide a novel wheat-based lipoprotein which can advantageously replace regular vital wheat gluten and prior art modified wheat glutens in baking and other applications.

It has now been found, and this finding forms the basis for the present invention, that gliadin will react or complex under special conditions with selected polar anionic lipids to form a novel lipoprotein having very advantageous properties.

It is not necessary to isolate the gliadin prior to its being complexed with the lipid, since the activity of the new lipoprotein is very evident even in the presence of other wheat protein constituents, hence the novel lipoprotein may be produced in situ, so to speak, by treating gluten under the special conditions with the lipid. Moreover, it has also been found that the addition of a selected lipid in its hydrated form to the batter make up water in a wheat flour washing process, will, under certain processing conditions, result in the separation of wheat flour into starch and protein fractions, the latter comprising the novel lipoprotein of the present invention in association with other proteinaceous material. Not only does this method produce a gluten product having a creamy, soft consistency which is readily and conveniently handled, the indications are that the resulting gluten product is more functional than that produced by treating isolated gluten.

In fact, these latter two embodiments constitute preferred aspects of the present invention because of the ready availability of the starting materials and the fact that the resulting gluten product exhibits the advantageous properties of the novel lipoprotein to an extent proportional to the amount of lipoprotein contained therein.

The novel lipoprotein complex per se, and products containing same in combination with other materials, as described above, have improved properties compared with other wheat protein products. In particular, the products in addition to dispersing and resisting coalescence in dilute aqueous media, e.g. 2.0% sodium chloride solution (which is used to simulate a "brew" of the type employed in the production of continuous and specialty breads) at least as well as the known products and also have enhanced extensibility and film formation ability not exhibited by the known products. Moreover, in certain systems, it has been found that the products of this invention have been shown to have thixotropic and also thermoplastic properties which open up applications not heretofore open to known gluten products.

BRIEF DESCRIPTION OF THE DRAWINGS

FIGS. 5 to 8 are photomicropraphs of frozen sections of regular vital gluten and various gluten-lipid combinations.

STATEMENT OF INVENTION

Figure 2:
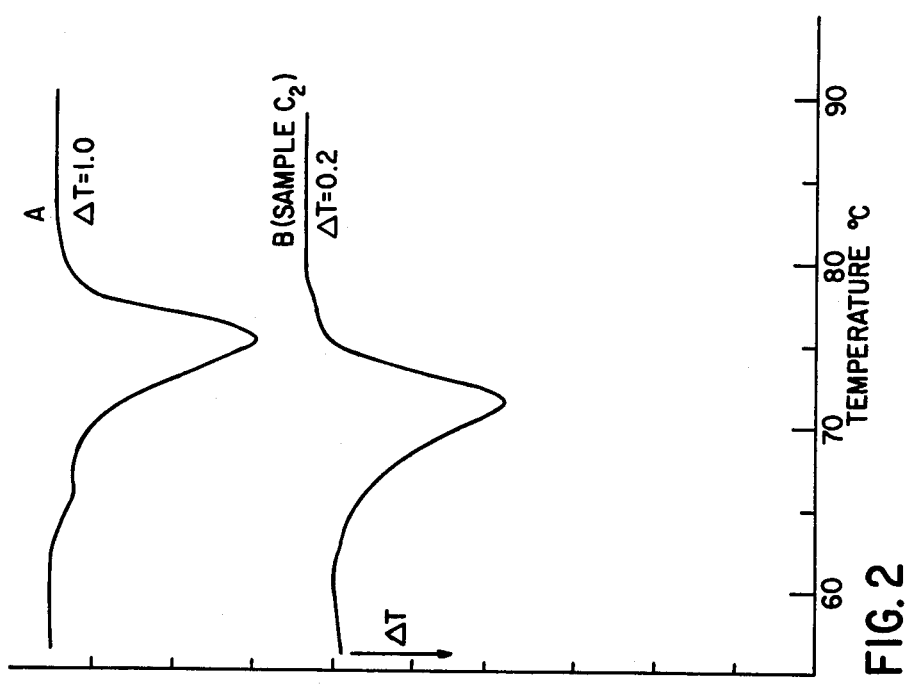
FIG. 2 illustrates the m.t.e.s for GMS and GMS incorporated into gluten according to U.S. Pat. No. 4,035,519.

According to one aspect of the present invention, there is provided a novel lipoprotein complex comprising gliadin reacted with a selected polar anionic lipid.

The selected "(polar) anionic lipids" to be used according to the present invention fall within the generally accepted definition of "anionic lipid" which states that the term refers to a class of compounds, and derivatives thereof, which is characterized by a hydrophobic hydrocarbon chain or "tail" covalently bound to a hydrophilic polar group or "head" carrying a negative charge when allowed to ionize. In addition, the lipids must meet certain criteria when evaluated by a simple test given later in this specification.

Specific lipids which meet the above criteria and constitute preferred classes of lipids are:

(a) Alkali metal alkyl aryl sulphonates;

(b) Diacetyl tartaric acid esters of mono- and diglycerides; and (c) Palmitoyl-l-aspartic acid.

The lipoprotein according to the invention may be used alone, for example, as a baking additive, or more conveniently may be contained in admixtures with other proteinaceous material such as gluten, soy, etc. to form a protein baking additive having increased functionality compared with conventional gluten products.

In a further embodiment, the present invention provides a protein composition comprising a lipoprotein complex of gliadin and a selected polar anionic lipid formed in situ by treatment of wet vital wheat gluten with the said lipid. In a modification of this embodiment, the protein composition comprises a lipoprotein complex of gliadin and a selected polar anionic lipid created in situ by forming a wheat flour dough or batter in the presence of a hydrated anionic lipid, thereafter separating as much of the starch, fibrous and soluble components as desired by known means, leaving a product which contains all of the formed lipoprotein and which may be dried if desired. In this embodiment, the lipoprotein is formed with the greatest efficiency in that the work required to form the dough or batter is adequate to accomplish substantially complete reaction between the selected anionic lipid and the native gliadin.

In product aspects of the invention wherein the lipoprotein complex is formed in situ by treatment of gluten or wheat flour, complete complexing of all the gliadin is not essential: something short of the maximum being sufficient. A product giving the advantages of the present invention is obtained provided that at least 50% of the gliadin which is capable of reacting with the lipid is actually in the complexed state. The level of lipid required to achieve this will vary since flour and gluten are natural products and some variance in the level of gliadin present must be expected. Also since the concentration of active ester in the various commercial lipids available will also vary, then it is obvious that the amount of commercial lipid preparation which is required per unit of flour or gluten to form the lipoprotein complex will vary up to a maximum which is characteristic of the particular lipid preparation used. This point will be discussed in more detail hereinafter.

It is more convenient, from a practical viewpoint, to work in terms of the amount of lipid per unit of gluten. When formulated in this manner, it has been found that the amount of lipid need not exceed 10% of the weight of the gluten. Products having as low as 1% by weight of lipid exhibit very useful properties and about 7% by weight based on the weight of gluten has been found to be optimal. These amounts provide the essential greater than 50% complexing of available gliadin in the gluten.

In addition, it is believed that the products formed directly from wheat flour are more effective or efficient due to the possible utilization of gliadin which would, if the wheat flour were subjected to the normal washing operation, be irreversibly bound in some manner and hence, become unavailable for complexing with the added lipid.

In a further process embodiment of the invention, gluten and a selected polar anionic lipid are reacted together in dilute aqueous medium having a pH of less than 7 at a temperature below that at which the protein will denature, under the stated conditions, until the desired degree of complexing has occurred.

Turning to the reaction conditions in more detail, the dilute aqueous medium contains at least about 50% moisture and generally more than 60%. For practical reasons, if wet gluten is to be treated, the direct product of the known starch washing operations is preferably used, this containing from 60% to 70% and usually about 66% moisture.

The reaction may be effected at a temperature ranging from below ambient (when cooling may be required) to a maximum less than that at which the protein loses its vitality under the conditions involved, (i.e. usually about 70° C.). From a practical viewpoint, temperatures of from about 15° to 35° C. are satisfactory and preferred since heating the mass of gluten is thus unnecessary, especially since the wet gluten emanating from the washing processes generally has a temperature of from 20° to 25° C., usually about 22° C.

The use of the relatively low temperatures has a further significant advantage, namely, given otherwise fixed mixing conditions, the lower the mixing temperature the greater the delay in the onset of the undesirable "rubbery state" (see later), i.e. the longer the duration of the "soft state" during which the desired products are formed. This allows for greater flexibility in carrying out the process, a significant feature of any industrial scale process.

In yet a further process aspect, the present invention provides a wheat flour washing process wherein a selected anionic lipid is incorporated into the dough or batter prior to washing. The proteinaceous fraction obtained after removal of the starch fraction being the desired product containing the gliadin:lipid complex.

In this embodiment separation of the desired proteinaceous product may be effected by centrifuging the batter whereupon the product is obtained in an easily handleable, creamy, soft form.

The lipid will generally be semi-solid or solid at ambient temperatures. Complexing of lipid and gliadin according to the present invention may be effected by reaction of melted lipid with the gliadin or gluten substrate. However, such a procedure is considered inefficient, inter alia, because the substrate must be heated to a temperature above the melting point of the lipid otherwise re-crystallization thereof occurs preventing complexing from occurring. Also, melted lipid cannot be used in the process embodiment which involves washing wheat flour in the presence of the lipid.

In the preferred embodiment, the lipid is converted into the corresponding hydrate prior to complexing. The preparation of lipid hydrates is known—refer for example to Small, D. M., "A Classification of Biologic Lipids Based Upon Their Interaction in Aqueous Systems", *J.A.O.C.S.* 45, March 1968, pp. 108–119; Chapman, D., Williams, R. M., Ladbrooke, B. D., "Physical Studies of Phospholipids", *Chem. Phys. Lipids* 1, 1967 pp. 445–475; Ladbrooke, B. D. and Chapman, D. "Thermal Analysis of Lipids, Proteins and Biological Membranes", *Chem. Phys. Lipids* 3, 1969, pp. 304–367; Eastman Chemical Products Inc., "Aqueous Systems—Dispersion Procedure", Publication ZM-IC, March 1976, p. 8. The lipid in hydrate form has been found to promote the desired complexing most efficiently and, moreover, in that form, the lipid is not subject to the temperature restriction referred to above when melted lipid is used. In other words, the lipid hydrates may be used according to the present invention at temperatures below the lipid melting point and thus, it is unnecessary to heat the protein substrate prior to complexing with the lipid and this provides obvious significant advantages. In fact, it has been found that complexing takes place totally satisfactorily as regards, for example, efficiency and speed of reaction, at ambient temperatures and hence temperatures within the range of 15° to 35° C. are preferred for practical reasons.

As indicated previously, use of the lipid in hydrate form is essential if the advantageous wheat flour washing embodiment according to the present invention is used. It may be noted that, although lipid hydrates are known, it has not been considered practical to use certain lipids, e.g. diacetyl tartaric acid ester of monoglycerides (DATEM) in that form on account of their instability. However, such lipid hydrates do not show significant degradation or breakdown over a period of at least several hours, a period found to be quite sufficient to carry out the process of the present invention.

The pH of the reaction medium is very important, acid pH's being essential. The pH preferably falls within the range of 2 to 7 and, depending on the lipid being used, most preferably from 5 to 6, i.e. just below the isoelectric point of gliadin.

The amount and type of mixing required is not critical but must be sufficient to effect the desired extent of complex formation. When gliadin per se is being treated, minimal mixing is required and the reaction is extremely rapid. However, when the gliadin which is to be reacted is contained in a firm, rubbery gluten mass, the rate of the desired reaction, which is directly proportional to the rate of contact between the reactants, is therefore also directly proportional to the rate of and/or extent of mixing. It has been found that high speed/shear mixing which greatly reduces the required mixing time is highly desirable. Such mixing is also helpful when a batter or a dough is used in a washing process embodiment of the invention. In the latter embodiment, when a batter is used, the mixing required to prepare the batter is sufficient to effect the desired complexing.

A further finding is that, in the presence of oxygen (e.g. air) the reaction mixture is in some cases, susceptible to being converted to an undesirable rubbery state, which succeeds the desired product, very rapidly. Obviously, the longer the mixing the greater the probability of the onset of the rubbery state. With high speed/shear mixing, the desired complex is produced before the presence of oxygen can significantly affect the reactants and desired product as it is formed. This undesirable effect can be reduced or eliminated by effecting the mixing under a substantially oxygen-free atmosphere. This may be achieved by applying vacuum or by maintaining an inert gas, say, nitrogen, atmosphere above the reaction mixture, during mixing. In such cases the possibility of the onset of the undesirable rubbery state before the obtention of the desired product is significantly reduced or even eliminated. It is preferred, therefore, that the process of the present invention be effected in the substantial absence of oxygen.

There are several other factors which affect the progress of the reaction between the gliadin and the lipid and these are as follows:

(i) The complexing between the gliadin and lipid has been found to be adversely affected by high ionic strength in the reaction medium and, hence, low ionic strength reaction media are preferred. The ionic strength of the medium may be controlled by:
  (a) avoiding or reducing the amount of salt utilized in the washing process so that the "carry over" into the (wet) gluten is less;
  (b) avoid high ash flours;
  (c) avoid using hard water; and
  (d) employ as dilute as possible reaction medium.

(ii) It has also been found that when gluten or flour is used, there are conditions which appear to promote binding between the gliadin and other flour components and hence the gliadin becomes unavailable for lipid complexing required to achieve the desired product. Obviously, such conditions should be avoided.

(iii) The importance of mixing in the complexing reaction has been discussed above. However, it should be emphasized that excessive mixing can be detrimental to some of the properties, e.g. dispersive properties, of the product, and can pose problems when drying the product.

The present invention will be further described with reference to, but not limited by, the following specific examples.

As will be obvious from the above, the most preferred products according to the present invention, because of the present ready availability of the starting materials, are those wherein the lipoprotein is formed in situ and consequently full evaluation of the lipoprotein per se (i.e. in isolation) was not considered necessary. Therefore, the majority of the experimental work has been carried out on the product embodiments of the present invention wherein the novel lipoprotein is associated with other proteinaceous material.

EXAMPLE 1

The products of the present invention are only obtained when a selected small group of polar anionic lipids are used. In this example, a series of lipid preparations are evaluated for their relative ability to complex with gliadin. The test procedure by which the lipids to be used according to the present invention are selected is:

(i) In each instance, one part by weight of a lipid preparation, (as a hydrate formed by adding 3% by weight of lipid, at a temperature several degrees above its melting point, to water at the substantially same temperature, and agitated sufficiently to produce a smooth dispersion, whereafter the pH is adjusted to pH 5.6 and the dispersion is cooled to room temperature) was added to twenty (20) parts by weight of gliadin (as a solution, 3% by weight in water at pH 5.6). The insoluble gliadin-lipid complex formed very rapidly, if at all, and was removed by centrifuging. The amount of protein (i.e. gliadin) remaining in the extracted liquid was determined by standard procedures and the amount of gliadin complexed with the lipid obtained by difference.

(ii) In addition, in the cases where a insoluble lipoprotein complex was obtained, the extensibility and relative strength of films formed therefrom was also evaluated by a simple hand manipulation procedure whereby a set amount of complex, typically about 5 gm, was gripped in both hands and continuously extended in two directions at right angles and, if a translucent film, of approximate dimensions of 3"×3" resulted, i.e. the sample did not break or snap prior to attaning said film, an evaluation of the strength of the film was made by sharply tapping the centre of the film. The resulting value, on a scale of 0-6, was taken into account both the extensibility and strength factors, a lipid suitable for use according to the present invention giving a value of 3 or more. The results of both these tests are contained in the following table:

TABLE I

| Emulsifier Type | Trade Name | mg Gliadin Complexed per mg of Emulsifier* | Film Forming Ability |
|---|---|---|---|
| Polar anionic lipids according to the invention | | | |
| Alkali metal aryl sulphonates | | | |
| Sodium dodecyl sulphate | SDS | 19.2 | 6 |
| Diacetyl tartaric acid esters of fatty acids | Panodan AM | 13.1 | |
| | Panodan AB 90 | 12.8 | |
| | Panodan 80 | 7.9 | 5 |
| | Panodan 249 | 7.9 | |
| | Admul 275 | 11.2 | |
| | Data 1901 | 6.4 | |
| Palmitoyl-1-aspartic acid | — | 15 | 4 |
| Polar anionic lipids not according to the invention | | | |
| Calcium stearoyl-lactylate | Verv | 0.0 | — |
| Polyglycerol esters | Admul 1405 | 4.5 | 0 |
| | Admul 1411 | 0.2 | — |
| | Admul WOL | 0.2 | — |
| Polyoxyethylene derivatives of fatty acid partial esters of hexitol anhydrides | Tween | 0.0 | — |
| Succinylated monoglycerides | Myvatex super DO | 0.5 | — |
| Acetylated monoglycerides | Myvacet 9-45 | 0.0 | — |
| | Myvacet 5.07 | 0.0 | — |
| Sucrose esters | Glycolid | 0.0 | — |
| Mono- & diglycerides | | 0.0 | — |

Key
"—" means no complex formed.
"0" means complex formed but no film.
"1 to 6" is evaluation of film strength.

The results given in Table I indicate:

(1) At a given pH, there is effectively a maximum amount of lipid which will complex with an amount of gliadin. To produce the lipoprotein of the present invention, it is not necessary to complex all the gliadin available to the lipid. The desired results are obtained provided at least fifty percent of the gliadin capable of reacting with the lipid is actually in the complexed state.

(2) The desirable film-forming properties are more a function of the type of lipid complexed than of the amount of lipoprotein complex formed. While the simple hand manipulation procedure for evaluation of film-formation is subjective, it is sufficiently accurate to determine lipids which may be used according to the present invention from those which do not provide the claimed advantages when so utilized because of the great difference between the physical properties of the complexes which did form.

(3) The majority of lipids/emulsifiers which are presently used in the food area do not form lipoprotein complexes under the given conditions.

(4) Although lipids other than polar anionic lipids, for example, non-ionic lipids such as ADMUL 1405, may in isolated instances form a gliadin lipid complex, such complexes do not exhibit any film forming capability and hence do not fall within the ambit of the present invention.

(5) Presently available evidence indicates that sodium dodecyl benzene sulphonate is the most effective polar anionic lipid in practising the present invention.

EXAMPLE 2

Preparation in situ of the gliadin-lipid complex of the present invention

Procedure

3000 G of freshly thawed wet vital gluten (approximately 66% moisture) at 10°–15° C., was placed in a Prodex mixer modified by the addition of cutter blades (bowl temperature 25°–30° C.). A Panodan AM hydrate preparation (pH 3.6–3.9) was prepared by dispersing 110 g of Panodan AM* flakes in 440 ml of $H_2O$, containing 4.5 g of NaOH, at 60°–65° C. The sample was mixed vigorously using medium speed on a Waring blender for about two minutes until uniform (pH 3.6–3.7). The Panodan hydrate preparation was added to the wet gluten in the Prodex, vacuum was drawn and sample mixed at 2600 r.p.m. for 20 seconds, when mixing was stopped and the bowl is scraped down. Vacuum was drawn again and sample mixed for an additional 20 seconds, when the product obtained had a uniform soft oatmeal-like consistency. (The temperature of the product was 18°–24° C.).

*Obtained from Grinstead Products Inc.

EXAMPLE 3

As discussed in detail throughout the present text, the lipoprotein of the present invention is a true complex and therefore, for the most part, effectively none of the added lipid is free. To demonstrate this fact and compare the product of the present invention with the previously mentioned prior art products, the various products were subjected to various analytical procedures as described hereafter.

A. Differential Solvent Extractability

Stated very basically, the concept of differential solvent extractability resides in the fact that the strength of the lipid-protein bond is dependent upon the bond type, which in turn directly determines the method required to extract the lipid from the protein. As documented in the literature, it follows that the type and strength of a lipid-protein bond is indicated by the type and strength of the solvent required to extract the lipid from the protein. Accordingly, lipid-protein bonds may be classed as electrostatic (coulombic), hydrophobic (in aqueous environments) or covalent, the latter bond type rarely occurring in lipid-protein complexes.

With the above in mind, the quantity of bound or complexed lipid, the amount of free or unbound lipid and the total lipid content were determined by the widely accepted general definition set forth by Pomeranz et al, in "Wheat: Chemistry and Technology", published by the American Association of Cereal Chemists, second edition, (1971), pages 393–395 and 415–416:

Bound lipid = total lipid − free lipid

In the present experimentation, the total lipid was extracted by use of a strong, polar solvent as suggested by the Pomeranz et al reference, namely a mixture of chloroform/methanol, while the free lipid fraction was extracted using a non-polar solvent, namely chloroform. The bound lipid is then calculated as per the above-stated equation.

Experiments were carried out which compared the free lipid content, as a percent of added lipid, of various prior art lipid-protein preparations with representative samples of the lipid-protein complex of the present invention. The prior art compositions were prepared exactly duplicating, where possible, the processes as disclosed in the respective texts.

The specific lipid determination by differential solvent extractability of the prior art and present gluten products was performed as follows:

(i) Total lipid content 10.0 G of dry gluten was extracted with 100 ml of MeOH/CHCl$_3$ (2:1 by volume) for 2 hours at 22°-23° C. The sample is then filtered through Whatman #2 filter paper. The total solids content was determined on an aliquot of the filtrate by evaporating off the solvent in air and drying the residue to constant weight at 80°-85° C. Another aliquot of the same filtrate was taken and the protein content determined by the standard Kjeldahl method. The total lipid content was calculated as being the total MeOH/CHCl$_3$ extractable material minus the protein. (While the filtrate was also assayed for carbohydrate and pentosan content, no significant quantity of either was determined.)

The above method is a modification of the Bligh and Dyer procedure as detailed in Techniques In Lipidology by M. Kates, page 350 (1972), (North-Holland Publishers Co.).

(ii) Free lipid content 10.0 G of dry gluten was extracted as per part (i) above but substituting CHCl$_3$ for the MeOH/CHCl$_3$. This procedure being defined by N. Krog, Journal of the American Oil Chemists Society, volume 54, page 129, (1977).

The results of analyses by solvent extraction are summarized in Table II.

TABLE II

| Sample | Type of Lipid Added | % Lipid Added | Free[1] Lipid | Method of Addition |
|---|---|---|---|---|
| A | — | — | — | Regular vital gluten control. |
| B$_1$ | MDG | 20* | 112 | Breddo (Top-Scor Products U.S.P. 3,362,829) |
| B$_2$ | GMS | 20* | 99 | commercially available product used (dry gluten coated with melted lipid). Product basically prepared by General Mills process of |
| C$_1$ | GMS | 10.0 | 106 | U.S.P. 4,035,519; |
| C$_2$ | GMS | 16.0 | 95 | pre-melted lipid mixed with wet gluten in a 300 g farinograph bowl at 150 r.p.m. for 10 min. at 60° C. |
| D | GMS | 12.3 | 95 | Product prepared via Example 14 of Far-Mar-Co. U.S.P. 3,880,824 Product prepared |
| E$_1$ | Panodan AB90 | 7.4 | 0 | by process of present invention; |
| E$_2$[2] | Panodan AB90 | 15.7 | 48 | wet gluten + Panodan hydrate mixed at 2,600 r.p.m. for 40 sec. at 30° C. |
| E$_3$ | Panodan AM | 9.1 | 13 | |
| F (Control) | Panodan AM | 10.0 | 97 | Dry blend of dry gluten and powdered Panodan AM |

*estimated level based on protein and total lipid analysis (determined by the extraction method described hereinbefore).
[1]free lipid determined by CHCl$_3$ extraction expressed as % of total lipid added following correction for the quantity of native free lipid.
[2]sample E$_2$ is included merely to demonstrate that addition of over about 10% added lipid is excessive in preparing a satisfactory product since at this level of addition a diproportionately small amont of the added lipid was bound.

| MDG | mono and diglycerides |
| GMS | glycerol monostearate |
| Panodan AM } Panodan AB90 } | a diacetyl tartaric acid ester of a monoglyceride obtained from Grinstead Products Inc. |

B/C Differential Thermal Analysis (DTA) and Differential Scanning Calorimetry (DSC)

Introduction

The term lipid or emulsifier is used herein to describe a molecule having a polar head group attached to (one or more) hydrocarbon chains as defined hereinbefore. At temperatures below their melting point, lipids are in a crystalline form, resulting from the force exerted by the dipoles which causes the molecules to align in a three-dimensional lattice. As the lipid is heated above its melting point, energy is absorbed, breaking the bonds holding the molecules in the crystal lattice. The melting transition can be studied by either DTA or DSC technique using, for example, a Dupont Thermal Analyzer.

B. Differential Thermal Analysis (DTA)

Introduction

DTA involves heating the sample being evaluated and an inert reference material (glass beads) at a constant rate. The temperature differential ($\Delta T$) between the sample and the reference is plotted against the actual sample temperature. During a melt-transition, energy is absorbed by the sample, and its temperature increases more slowly than that of the control. This difference in temperature increase is recorded as an endothermic dip on a DTA tracing—refer for example to FIG. I, (Curve 1). The minimum point of the endotherm corresponds to the melting point of the sample.

It has now been found that when certain lipids are mixed with gluten, under the proper conditions, there is a possibility of forming lipo-proteins. When such complexes are formed, the lipid molecules are no longer free to align in their original crystal structure. The DTA tracing would then show no endotherm, since there would be no crystal structure to melt.

Results

The following substances were subjected to DTA analysis using a Dupont Thermal Analyzer 990.

Analyses were carried out using, where possible, the commercially available prior art lipid-gluten compositions. In all instances the moisture content of the gluten in the samples was less than 5%. The heat rate in all tests was 5° C./minute. The Y-axis sensitivity settings ($\Delta T$) are provided in the respective figures.

The corresponding melt-transistion endotherm (m.t.e.) obtained being shown in the stated figures:

FIG. 1

Curve A—the m.t.e. for pure glycerol monostearate (GMS) obtained from Eastman Chemicals. GMS control curve.

Curve B—the m.t.e. for GMS when coated on gluten as described in U.S. Pat. No. 3,362,829.

FIG. 2

Curve A—GMS control curve as defined above.
Curve B—the m.t.e. for GMS incorporated into gluten as disclosed in U.S. Pat. No. 4,035,519.

FIG. 3

Curve A—GMS control curve as defined above.
Curve B—the m.t.e. for GMS incorporated into gluten as defined in U.S. Pat. No. 3,880,824.

FIG. 4

Curved A—the m.t.e. for a pure diacetyl tartaric acid ester of a hard monoglyceride (Panodan AM) obtained from Grinstead Products Inc.
Curve B—the m.t.e. for Panodan AM incorporated in lamellar hydrate form into wet gluten according to the process of the present invention.
Curve C—the m.t.e. for Panodan AM fineyy dispersed in powder form in dry powdered gluten.
Curve D—the m.t.e. for regular vital gluten with no added lipid.

Discussion of Results

Figure 1:
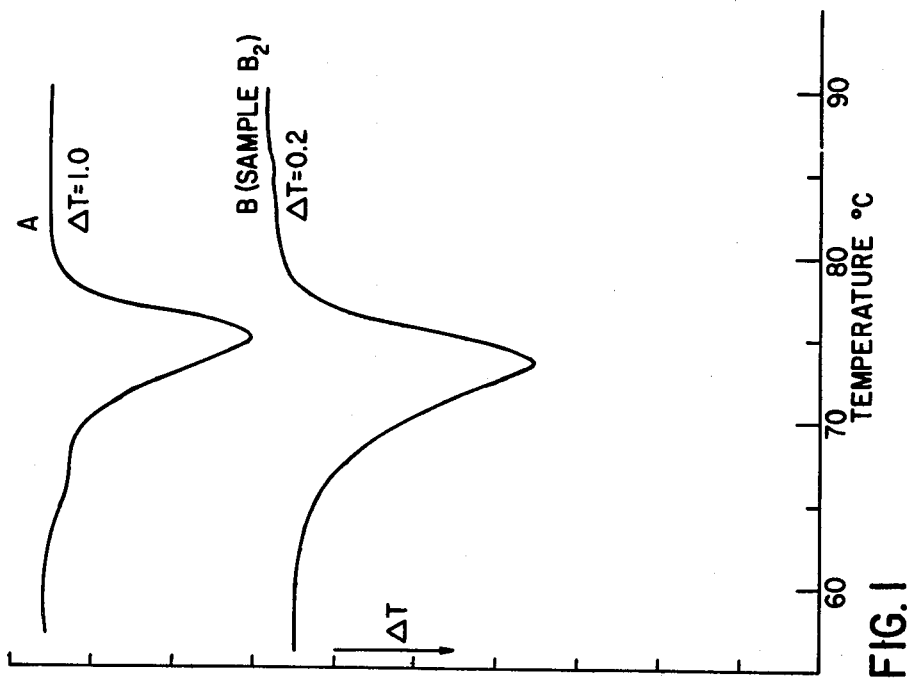
FIG. 1 illustrates melt-transition endotherms (m.t.e.) for pure glycerol monostearate (GMS) and vital gluten coated with GMS.
Figure 3:
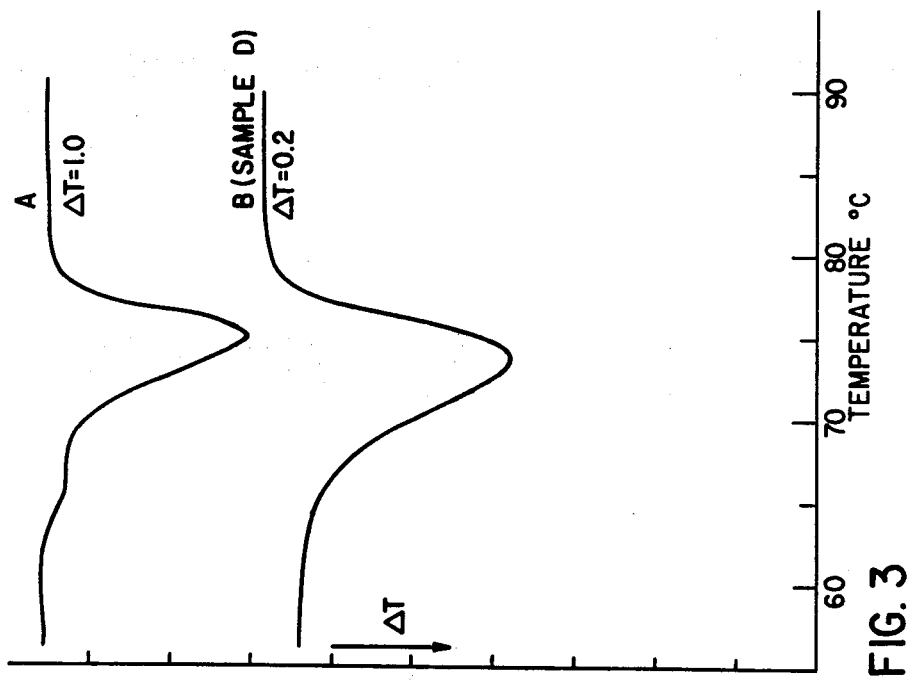
FIG. 3 illustrates the m.t.e.s for GMS and GMS incorporated into gluten according to U.S. Pat. No. 3,880,824.

From FIGS. 1–3, it is clearly evident that all the prior art compositions (FIG. 1–3, curves B) exhibited m.t.e. values substantially the same as the pure GMS control curves (FIG. 1–3, curve A) indicating the lipid to be in a free, uncomplexed state.

Figure 4:
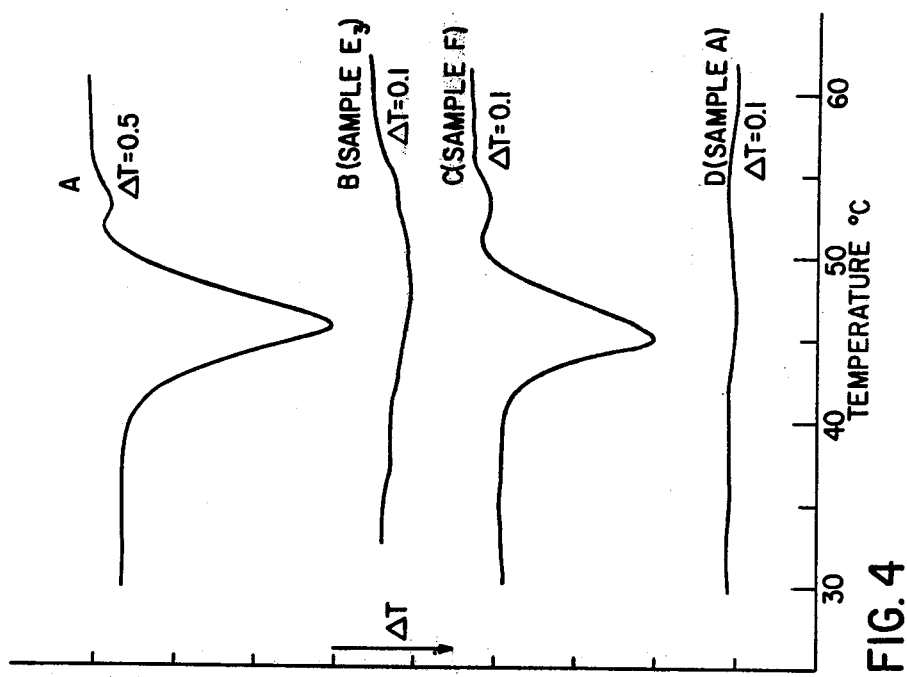
FIG. 4 illustrates the m.t.e.s for pure Panadan AM; Panadan AM incorporated in Lameller hydrate form into wet gluten according to the invention; Panadam AM finely dispersed in powder form in dry powdered gluten and regular vital gluten with no added lipid.

In direct contrast thereto, there is no substantial m.t.e. shown by the composition of the present invention (FIG. 4, curve B) compared to the m.t.e. shown for pure Panodan AM control (FIG. 4, curve A) indicating effectively no free uncomplexed lipid. The m.t.e. for the composition wherein Panodan AM was dispersed in dry gluten (FIG. 4, curve C) was about the same as that for the pure Panodan control curve suggesting no significant complexing of lipid with protein. The m.t.e. for regular vital gluten with no lipid added illustrates no significant quantity of free crystalline lipid (FIG. 4, curve D).

C. Differential Scanning Calorimetry (DSC)

Introduction

DTA indicates only the existence of a melt-transition and the temperature at which it occurs. DSC however is quantitative with certain qualifications as will become apparent.

Procedure

Using a DSC cell a known weight of sample is heated in a sealed container and the energy to maintain the sample at the same temperature as an inert reference is measured. An endotherm is obtained where heat flow (mcal/sec) into the sample is plotted against time. The area under the curve represents the total heat required to melt the known weight of sample. The heat of fusion ($\Delta H$) can than be calculated using the following equation:

$$\Delta H \text{ (mcal/mg)} = 60 \text{ (B)(E)}(\Delta S) \text{ (area)/sample wt.}$$

wherein
B = time base setting (in./min.)
E = calibration constant
$\Delta S$ = Y-axis sensitivity (mcal/sec./in.)

Each lipid will have a different $\Delta H$ value depending upon its specific crystal structure.

As discussed previously in respect of the DTA evaluation only *free* lipid in a gluten-lipid mixture will undergo a melt-transition and produce an endotherm. The amount of free lipid in a a gluten-lipid mixture may therefore be found if the amount of added lipid and its $\Delta H$ are known. However, as indicated above, there are factors which introduce limitations into this procedure, in particular:

(a) The type and amount of lipid in the sample must be known;

(b) $\Delta H$ values of a specific lipid vary greatly depending on its purity (which can, and does, vary from batch to batch); and (c) At lower sample lipid levels, say below 5%, the experimental error is greatly increased due to the buffering effect of non-lipid material in the sample.

Results

The amount of free lipid in the various products is determined by DSC is given in the following Table III. Also included in the table are the corresponding results obtained by the known chloroform solvent extraction procedures for determining free lipid referred to above.

| Sample | Free Lipids (As % of Total Added Lipid) | |
|---|---|---|
| | By CHCl$_3$ Ext. | By DSC |
| B$_2$ | 99 | 77* |
| C$_2$ | 106 | 86 |
| C$_4$ | 95 | 85 |
| E | 13 | 0 |

Conclusions

1. Bearing in mind the limitations of the DSC procedure, the two values for the lipid content compare reasonably well.

2. It is believed that the low value for sample B$_2$ results from differences in the purity of the GMS used. Note: The DSC results were obtained as indicated in the following detailed calculations:

| Sample: C$_4$ | | | | | |
|---|---|---|---|---|---|
| Total Sample wt. (mg) | % Added Lipid | Added Lipid Wt. | $\Delta H^{(1)}$ | Area$^{(2)}$ | Free$^{(3)}$ Lipid Wt. |
| 5.916 | 16 | 0.946 | 32.1 | 2.40 | 0.796 |

$^{(1)}\Delta H$ of GMS
$^{(2)}$Area of DSC curve
$^{(3)}$Free lipid wt. calculated using equation (I)

$\therefore$ % Free Lipid = $\frac{0.796}{0.946} \times 100 = 84.1$

D. Microscopic Comparison

Microscopic studies employing crossed polarizing filters were undertaken to visually compare the existence of free lipid material in samples of prior art lipid-gluten preparations and those according to the present invention. The underlying concept of this experimentation is that any free lipid will be in crystalline form and, when viewed under polarized light, these crystals will be birefringent and thus be viewed as bright or white areas against a dark background. Ungelatinized starch granules will appear as white round or oval forms exhibiting a dark cross ("X" or "+") through the centre. Since the dry gluten powders were too coarse to determine clearly the degree of lipid dispersion, wetted gluten samples were used as described below.

The sample preparation comprised mixing gluten samples, prepared by the process defined in the corresponding patent specification if not commercially available, with 1.5 parts by weight of distilled water at 20° C. for one minute in a National Mfg. Co. Micro Mixer. The samples were then rounded into "dough balls" by hand, embedded, frozen and sectioned with a freezing microtone to provide uniform, 10μ thick sections. These sections were then mounted on slides using balsam and viewed under polarized light at 200× magnification and photographed.

The results are summarized below wherein the sample designation and lipid types are as defined in Table II.

| Figure | Sample | Type of Lipid | Description of Bifringent Material |
|---|---|---|---|
| | A Control- regular vital gluten only | None | only ungelatinized starch is visible |
| | $C_2$ | GMS | clumps and streaks of crystalline lipid - very little ungelatinized starch. |
| | $B_2$ | GMS | lipid not as well dispersed as in FIG. II - ungelatinized starch |
| | $E_3$ | Panodan AM | substantially no crystalline lipid visible - ungelatinized starch as in control |

From the above data and FIGS. 5-8, it may be seen that while crystalline (free) lipid is clearly evident in the samples of the prior art compositions effectively none is present in the sample of the product accordng to the present invention.

Evaluation of Functional Properties

A product of the present invention was evaluated by classical methods for determining relative extensibility and bake response. Also evaluated for comparison purposes were several of the known gluten products referred to previously. The samples tested were as A. Extensibility Procedure The various products were blended with wheat starch to 12% protein (14% moisture basis). 300 G of the gluten-starch mix was placed in Farinograph bowl and 2% sodium choloride was added to give a consistency of 500 B.U. Samples were mixed for four minutes at 60 rpm; held at 30° C. for 45 minutes and then measured on an extensiograph.

| Sample | Results Abs. (%) | Resistence (B.U.) | Extensibility (cm) |
|---|---|---|---|
| A | 62 | 890 | 78 |
| $B_1$ | 62 | 1000+ | 62 |
| $B_2$ | 65 | 825 | 65 |
| $C_2$ | 62 | 765 | 92 |
| D | 63 | 870 | 83 |
| $E_3$ | 65 | 725 | 130 |

B. Bake Test

Procedure
(a) Formula

| | Parts (by weight) |
|---|---|
| Flour (U.S. Baker's Perfect Patent) | 400 |
| Shortening | 12 |
| Sugar | 16 |
| Salt | 8 |
| $(NH_4)_2SO_4$ | 1 |
| Water | 199 |
| Yeast | 16 |
| Ascorbic Acid | 4 |
| | 4 |
| $KBRO_3$ | 12 |
| (Delpromase (maturing agent available from °Delmar Chemicals Limited) | 2 |
| Gluten sample | 8 |

Procedure

| Mixing Time | 30 sec. speed 1; 120 sec. speed 3 (Hobart with Duffy Bowl). |
|---|---|
| Rest | 10 min. @ 86° F. |
| Scale | 275 g |
| Rest | 10 min. @ 86° F. |
| Moulding on B & B | |
| Proof | 90 min. @ 116° F. |
| Bake | 19 min. @ 425° F. |
| Cool for one (1) hour and record | |

Results

| Sample | Loaf Volume (c.c.) | Specific Volumne (cc/g) |
|---|---|---|
| Control - flour | 2050 | 9.1 |
| A | 2125 | 9.4 |
| E | 2300 | 10.2 |

Conclusion

The superiority of Sample E, the product according to the present invention, in the bake test is self-evident from the above results. Other non-coalescing gluten products show no such comprehensive enhancement of baking properties.

What is claimed is:

1. A lipoprotein complex comprising gliadin reacted in an aqueous medium at a pH not greater than 7 and at a temperature less than about 70° C. witlh a polar anionic lipid, said lipid being selected from lipids which form a complex with gliadin wherein a 5 gram sample of the complex is extendable into a translucent film of approximate dimensions of 3 inches by 3 inches.

2. A lipoprotein complex according to claim 1 wherein the lipid component is sodium dodecyl sulphate.

3. A lipoprotein complex according to claim 1 wherein the lipid is a diacetyl tartaric acid ester of fatty acids.

4. A lipoprotein complex according to claim 1 wherein the lipid is a palmitoyl-l-aspartic acid ester of fatty acids.

5. A lipoprotein complex according to claim 1 wherein said lipid is selected from the group consisting of alkali metal alkyl aryl sulphonates, diacetyl tartaric acid esters of fatty acids and palmitoyl-l-aspartic acid esters of fatty acids.

6. A protein composition comprising a lipoprotein complex of gliadin and a polar anionic lipid which complex has been formed in situ by treating gluten with said lipid in a dilute aqueous medium containing at least 50% moisture at a pH of less than 7 and at a temperature of less than about 70° C., the amount of lipid being sufficient to ensure that at least 50% by weight of the gliadin present in the gluten is complexed, said lipid being selected from lipids which form a complex with gliadin wherein a 5 gram sample of the complex is extendable into a translucent film of approximate dimensions of 3 inches by 3 inches.

7. A protein composition accordng to claim 6 wherein said lipid is selected from the group consisting of alkali metal alkyl aryl sulphonates, diacetyl tartaric acid esters of fatty acids and palmitoyl-l-aspartic acid esters of fatty acids.

8. A protein composition comprising a lipoprotein complex of gliadin and a polar anionic lipid; which complex has been formed in situ by forming a wheat flour dough or batter having a pH of less than 7 and at a temperature of less than about 70° C., in the presence of a sufficient amount of said lipid to ensure that at least 50% by weight of the available gliadin is complexed followed by separation of the starch, fibrous and soluble components, said lipid beng selected from lipids which form a complex with gliadin wherein a 5 gram sample of the complex is extendable into a translucent film of approximate dimensions of 3 inches by 3 inches.

9. A protein composition according to claim 8 wherein said lipid is selected from the group consisting of alkali metal alkyl aryl sulphonates, diacetyl tartaric acid esters of fatty acids and palmitoyl-l-aspartic acid esters of fatty acids.

10. A protein composition according to claim 7 or 9 wherein the lipid is sodium dodecyl sulphate.

11. A protein composition according to claim 7 or 9 wherein the lipid is a diacetyl tartaric acid ester of fatty acids.

12. A protein composition according to claim 7 or 9 wherein the lipid is a palmitoyl-l-aspartic acid ester of fatty acids.

13. A composition according to claim 7 or 9 which comprises at most 10% by weight of lipid based on the gluten.

14. A composoition according to claim 7 or 9 which comprises about 7% by weight of lipid based on the gluten.

15. A process for the production of a lipoprotein comprising reacting gliadin with a polar anionic lipid at a temperature of not more than about 70° C. and in an aqueous medium having a pH not greater than 7, said lipid being selected from lipids which form a complex with gliadin wherein a 5 gram sample of the complex is extendable into a translucent film of approximate dimensions of 3 inches by 3 inches.

16. A process according to claim 15 wherein said lipid is selected from the group consisting of alkali metal alkyl aryl sulphonates, diacetyl tartaric acid esters of fatty acids and palmitoyl-l-aspartic acid esters of fatty acids.

17. A process according to claim 16 wherein said gliadin is present as a component of a gliadin-containing substrate.

18. A process according to claim 17 wherein said substrate is gluten per se.

19. A process according to claim 17 wherein said substrate is wheat flour, and the process includes the additional step of separating the starch, fibrous and soluble materials to leave the desired proteinaceous product.

20. A process accordng to any of claims 17, 18, 19, or 16 which is effected at a temperature of from 15 to 35° C.

21. A process according to claim 16 wherein said separation is effected by centrifugation.

22. A lipoprotein complex according to claim 1 wherein said lipid is hydrated.

23. A protein composition according to claim 6 or 8 wherein said lipid is hydrated.

24. A process according to claim 15 wherein said lipid is hydrated.

25. A lipoprotein complex according to claim 22 wherein said temperature is from about 15° C. to 35° C. and said pH is from about 2 to 7.

26. A protein composition according to claim 23 wherein said temperature is from about 15° C. to 35° C. and said pH is from about 2 to 7.

27. A process according to claim 24 wherein said temperature is from about 15° C. to 35° C. and said pH is from about 2 to 7 .

* * * * *